United States Patent [19]

Buettner

[11] Patent Number: 5,256,283
[45] Date of Patent: Oct. 26, 1993

[54] WATER CONDITIONER SYSTEM WITH INJECTOR VALVE

[75] Inventor: Nick W. Buettner, Waterford, Wis.

[73] Assignee: Erie Manufacturing Company, Milwaukee, Wis.

[21] Appl. No.: 934,958

[22] Filed: Aug. 25, 1992

Related U.S. Application Data

[62] Division of Ser. No. 606,508, Oct. 31, 1990, Pat. No. 5,174,337.

[51] Int. Cl.⁵ ............................................. C02F 1/42
[52] U.S. Cl. ....................................... 210/190; 210/278
[58] Field of Search ................. 210/190, 191, 269, 278

[56] References Cited

U.S. PATENT DOCUMENTS

| | | | |
|---|---|---|---|
| 2,577,524 | 12/1951 | Huppertz | 210/190 |
| 2,722,514 | 11/1955 | Sloan | 210/191 |
| 3,643,692 | 2/1972 | Traylor | 137/599.1 |
| 3,863,675 | 2/1975 | Wiltshire | 137/624.27 |
| 4,210,532 | 7/1980 | Loke | 210/136 |
| 4,632,150 | 12/1986 | Gagas | 137/625.46 |

Primary Examiner—Ivars Cintins
Attorney, Agent, or Firm—Andrus, Sceales, Starke & Sawall

[57] ABSTRACT

A water conditioner rotary valve for use in a water conditioning system includes a valve body constructed of an upper section, a lower section and a middle section, to facilitate ease in assembly of the body. The valve rotor member of the conditioner valve is driven by a Geneva drive system, to provide accurate positioning of the rotor member in its various positions. A valve seat member is located adjacent the rotor member, and provides a construction which improves the seal between the rotor member and the surface of the valve body adjacent thereto. The three-piece assembly of the valve body facilitates providing a valve capable of either upflow or downflow brining by replacing the lower valve section. A brine injector valve is mounted exteriorly of the valve body.

2 Claims, 8 Drawing Sheets

WATER CONDITIONER SYSTEM WITH INJECTOR VALVE

CROSS REFERENCE TO RELATED APPLICATION

This application is a division of application Ser. No. 07/606,508, filed Oct. 31, 1990, now U.S. Pat. No. 5,174,337.

BACKGROUND AND SUMMARY

This invention relates to a rotary valve for a water conditioner, and more particularly to a rotary valve incorporating features providing a lower cost of manufacture and increased performance capabilities.

A rotary valve is typically utilized in a water conditioning system to control an automatic water softener which includes a mineral bed which is periodically backwashed and then regenerated with brine supplied from a brine tank.

It is known to provide a rotary valve for placement at the open upper end of the mineral tank of the water softener. The valve functions in conjunction with the brine tank to selectively place the system into a service mode, a backwash mode, a brine/slow rinse mode and a fast rinse/brine tank refill mode.

One such valve assembly is disclosed in U.S. Pat. No. 4,632,150 to Gagas, owned by the same assignee as the present application. The valve structure disclosed in this patent has been found to provide satisfactory operation. However, the valve disclosed in this patent has a relatively high cost of manufacture, in that several gluing operations must take place in assembling the various components of the valve.

The present invention has as its object to provide a rotary valve structure for a water conditioning system of simple ad efficient design, providing a reduced cost of manufacture while increasing the performance capabilities and overall life of the valve structure. Another object of the invention is to provide a valve structure which is easily and cheaply adaptable to various use environments.

In accordance with the invention, a rotary valve adapted for mounting to the open top of a mineral tank comprises a valve body formed from an upper section, a lower section, and a middle section. The sections are mounted to each other such that the lower surface of the upper section is disposed against the upper surface of the middle section, and the upper surface of the lower section is disposed against the lower surface of the middle section. Each section includes one or more flow passages which communicate with each other when the sections are assembled to define a water flow path having an external inlet, an outlet into the tank, an inlet from the tank, and an external outlet. A ported rotor member is disposed between two of the valve body sections for controlling the flow of water through the passages formed in the sections. The ports in the rotor member open onto a surface adapted for placement adjacent to a surface of the valve middle section. A drive system is provided for selectively rotating the rotor member within the valve body to selectively place the passages in the valve body sections in communication with each other to control the flow path of water through the valve body.

In accordance with another aspect of the invention, an improved drive system is provided for imparting rotation to the rotor member of a rotary valve. The drive system comprises spaced Geneva cam surfaces on the rotor member, and a Geneva drive shaft engagable with the cam surfaces and movably mounted to the valve body. Drive means selectively imparts rotation to the Geneva drive shaft. The Geneva drive system for the rotor member eliminates inaccuracies introduced by prior art drive systems which typically comprised a rotating worm gear engagable with a worm wheel, or a pinion gear engagable with a spur gear.

The valve body can be assembled for either an upflow brining application or a downflow brining application. The upper and middle sections of the valve body have flow passages arranged so as to be usable in either application. Either an upflow or a downflow lower section is assembled to the upper and middle sections, depending on the application for the particular valve being assembled. In this manner, the valve body can cheaply and easily be adapted for use in either application.

A brine valve assembly is mounted to the exterior of the valve body. The brine valve is preferably assembled to the valve body middle section, which facilitates adaptability of the valve to either an upflow brining application or a downflow brining application.

In accordance with another aspect of the invention, an improved structure is provided for a valve seat disposed between the lower surface of the rotor member and a surface of the valve body adjacent thereto. The valve seat member is constructed of an annular stiffening member surrounded by a thermoplastic elastomeric material. The stiffening member is preferably in the form of a ring. The elastomeric material is formed around the stiffening ring so as to provide openings extending between opposite surfaces of the valve seat member. The elastomeric material is formed so as to provide rib structures on both sides of the valve seat member surrounding the openings to provide a fluid-tight seal between the rotor member and the surface of the valve body adjacent thereto.

In accordance with another aspect of the invention, structure is provided on the valve body for blending hard water from the inlet of the valve into the conditioned water, at the option of the operator. An inlet cavity is preferably formed in the valve body upper section for receiving intake hard water. A lug having a vertical passage is formed on the upper section adjacent a wall forming the inlet cavity. A treated water outlet is preferably formed in the valve body middle section, and the vertical passage is located over the treated water outlet. When hard water blending is desired, an opening is formed between the vertical passage and the hard water inlet cavity, and an opening is formed between the lower end of the vertical passage and the treated water outlet. A manually adjustable bonnett valve is placed in the vertical passage, to control the amount of hard water flowing from the inlet cavity to the treated water outlet.

In accordance with yet another aspect of the invention, an improved bypass valve structure is provided for controlling whether hard water is supplied to the inlet of the conditioner valve body or bypassed around the conditioner valve directly to the outlet. The bypass valve includes a valve body having an inlet passage and an outlet passage, and inlet and outlet ports. The bypass valve body is adapted for connection to the conditioner valve body such that the bypass valve inlet and outlet ports communicate with the inlet and outlet, respectively, of the conditioner valve. The bypass valve inlet passage and outlet passages are aligned with the inlet and outlet ports, respectively, and a spool passage is disposed therebetween. A spool member is disposed within the spool passage, and includes flow diverting structure which, when the spool member is in its bypass position, directs water directly from the bypass valve inlet passage to the bypass valve outlet passage through the spool passage. In its operating position, the flow diverting structure cuts off communication between the bypass valve inlet passage and its outlet passage, and diverts water from the inlet passage to the inlet of the conditioner valve.

Other objects, features and advantages of the invention will become apparent in view of the following description of the preferred embodiment of the invention taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
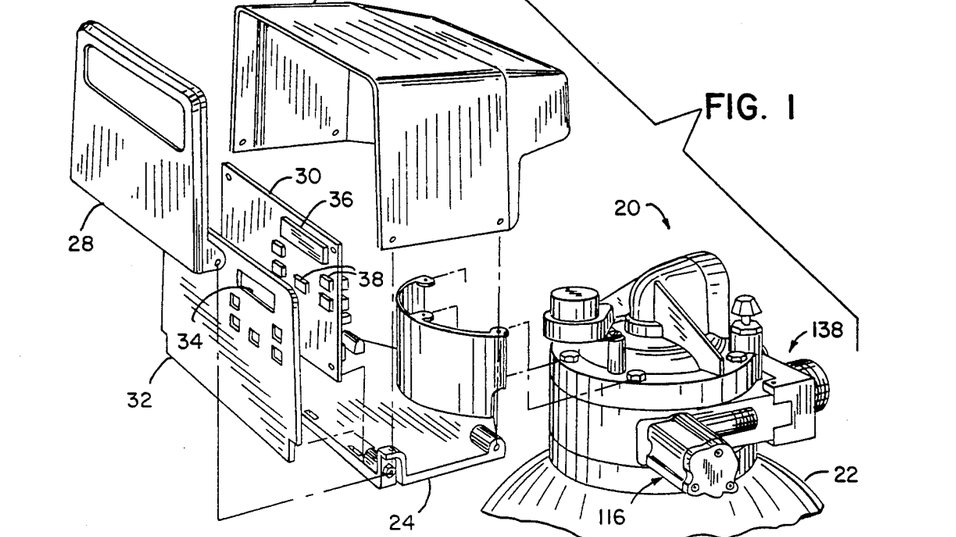
FIG. 1 is a partial isometric view showing a valve constructed according to the invention mounted to the upper end of a mineral tank, with the cover and control components of the valve shown in exploded fashion.

Referring to FIG. 1, a valve assembly 20 is shown mounted to the open upper end of a mineral tank 22 forming a part of a water conditioning system, as is known. Valve 20 is covered by a shroud assembly consisting generally of a lower portion 24 adapted for connection to valve 20, an upper portion 26 adapted for connection to lower portion 24, and a front plate 28. A control board 30 is adapted for positioning behind a plate 32, which contains a window 34 through which a visual read-out screen 36 of control board 30 is visible. A series of actuator buttons shown at 38 are accessible by an operator through openings formed in plate 32, for setting the functions of valve 20.

Control board 30 comprises a standard electrical circuit board to which a series of resistors, capacitors and microprocessors are mounted for controlling the operation of valve 20, in a manner as is known.

Figure 2:
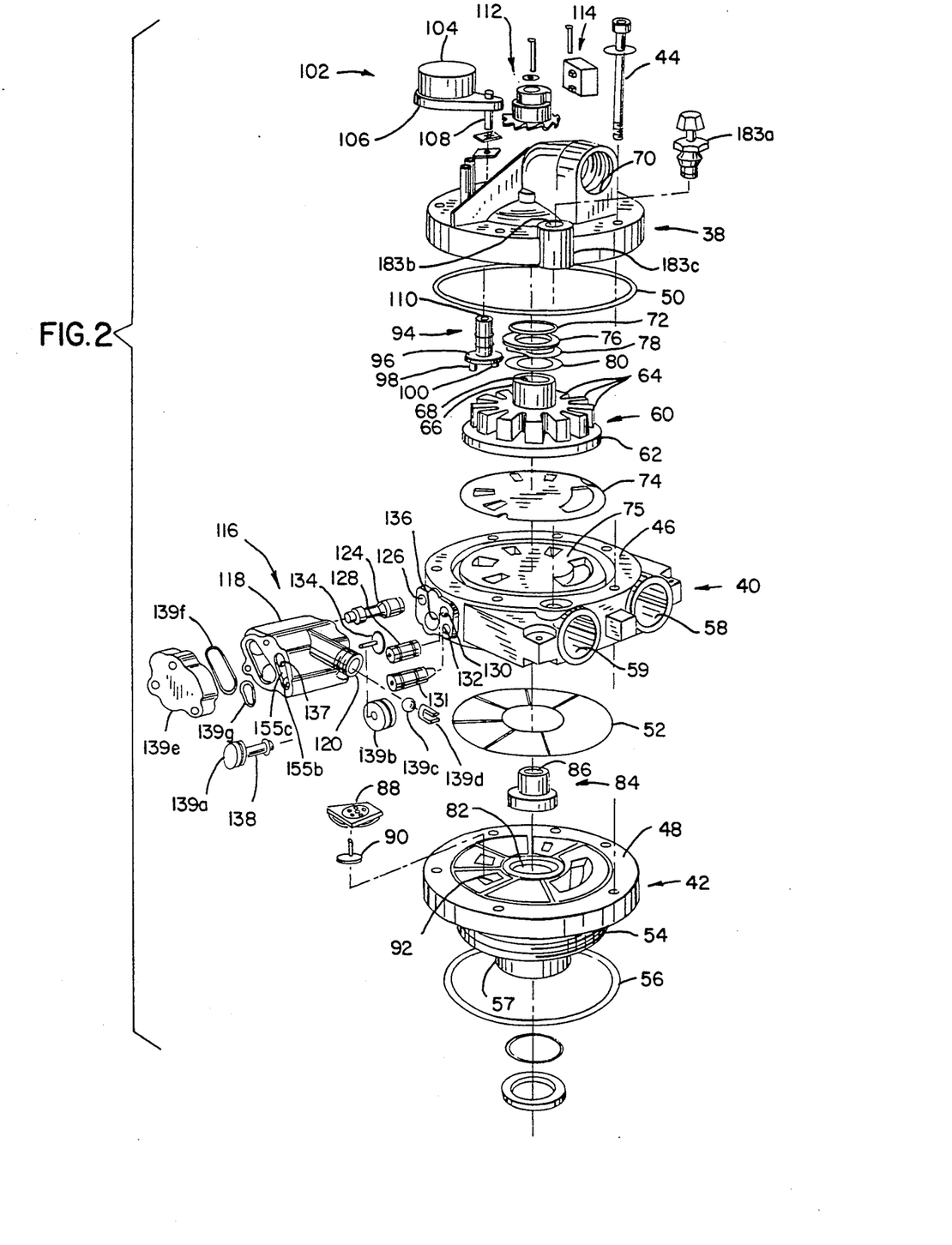
FIG. 2 is an exploded isometric view showing the various components of the valve of FIG. 1.

Referring to FIG. 2, valve 20 generally comprises an upper section 38, a middle section 40 and a lower section 42. Generally speaking, sections 38, 40 and 42 are adapted to be secured together to form valve assembly 20 by use of bolts, such as shown at 44, extending through openings formed in each valve section and engagable with nuts secured to lower section 42 in openings formed therein.

Upper section 38 has a substantially flat annular lower surface which is adapted for placement onto an annular flat upper surface of middle section 40, shown at 46. Similarly, a flat lower surface of middle section 40 is adapted for placement against a substantially flat annular upper surface 48 of lower section 42. An o-ring 50 is placed between upper section 38 and middle section 40, and a gasket 52 is placed between middle section 40 and lower section 42, for providing a fluid-tight seal between sections 38, 40 and 42 when assembled and secured together.

Lower section 42 includes a series of external threads 54 which engage internal threads formed in the open upper end of tank 22 for mounting the assembled valve 20 to tank 22, as shown in FIG. 1. An o-ring 56 provides a fluid-tight seal. The lower end of lower section 42 includes an inner annular hub 57, which is adapted to receive the upper end of a stand pipe (not shown in FIG. 2) which extends downwardly into the interior of tank 22.

Middle section 40 includes a fluid inlet port 58 for receiving hard water from a plumbing system, and a fluid outlet port 59 for returning treated water to the plumbing system.

A cavity is formed in the underside of valve upper section 38, and a rotor member 60 is adapted to be received into the cavity. Rotor member 60 generally includes a plate-like lower portion 62, a central portion providing a series of circumferentially-spaced cam surfaces 64, and an upstanding stem 66. Stem 66 is placed into an upwardly extending recess associated with the cavity formed in the underside of valve upper section 38, into which rotor member 60 is placed.

Stem 66 includes a central passage 68 which, when rotor member 60 is placed into the cavity in valve upper section 38, communicates with a drain outlet 70 formed in upper section 38. An o-ring 72 provides a fluid-tight seal to communication between passage 68 and drain outlet 70.

When the lower annular surface of valve upper section 38 is positioned against upper surface 46 of valve middle section 40, the lower surface of plate-like lower portion 62 of rotor member 60 bears against the upper surface of a valve seat member 74. The lower surface of valve seat member 74 bears against the upwardly facing internal surface 75 of valve middle section 40. A series of washers 76, 78 and 80 are positioned over rotor member stem 66 and are disposed between the upwardly facing surface provided by cam surfaces 64 and the downwardly facing surface forming the upper end of the cavity in the underside of valve upper section 38. Washer 78 is a wave spring-type washer which acts to bias rotor member 60 downwardly toward valve middle section 40 when valve sections 38, 40 and 42 are assembled together.

Lower valve section 42 is provided with a central passage 82. A float valve 84 is adapted for placement into seating structure formed at the upper end of passage 82. The upper end of float valve 84 is received into a recess formed in the underside of valve middle section 40 when sections 40 and 42 are assembled together.

An umbrella-type diaphragm check valve, consisting of a valve seat 88 and a diaphragm 90, is placed into the upper end of a passage 92 formed in valve lower section 42.

A series of ports and passages are formed in rotor member 60 and valve sections 38, 40 and 42 for providing flow of water through valve 20 in an appropriate path according to the operational mode in which valve 20 is placed. The water flow paths defined by rotor member 60 and the passages in valve sections 38, 40 and 42 will later be explained.

Referring still to FIG. 2, a Geneva drive shaft 94 is rotatably mounted in a passage formed in valve upper section 38. Drive shaft 94 is provided with a lower plate 96 having a pair of depending drive lugs 98, 100. A drive assembly 102 consisting generally of a motor 104 and a gear box 106, and including a depending output shaft 108, is adapted for mounting to the upper surface of valve upper section 38. Output shaft 108 is drivingly engagable with a passage 110 formed in the upper end of Geneva drive shaft 94.

Also mounted to the upper surface of valve upper section 38 are a rotatable actuator member 112 and a switch 114, which will later be explained in greater detail.

A brine valve assembly 116 is located exteriorly of valve middle section 40 and is connected to valve middle section 40. Brine valve assembly 116 includes a brine valve body 118 having a brine inlet nipple 120. An injector member 124 is adapted for placement partially into a passage 126 formed in the side of valve middle section 40, and partially into a passage formed in brine valve body 118 which alignment with passage 126. A fluid connector member 128 is adapted for placement partially into a passage 130 in the side of valve middle section 40, and partially into a recess in the rear surface of brine valve body 118. A brine refill control plug 131 is adapted for placement partially into a passage 132 in the side of valve middle section 40, and partially into a recess in the rear surface of brine valve body 118. An umbrella-type check diaphragm 134 is placed in an opening in the rear surface of brine valve body 118. An integral check seat 153 (FIG. 3) is formed in the rear surface of body 118, and a forwardly disposed extension of check seat 153 is engaged.

Referring again to FIG. 2, a brine shuttle assembly is adapted for placement into a passage 137 formed in a brine valve body 118, which intersects the brine inlet passage formed in brine inlet nipple 120. The brine shuttle assembly consists of a shaft 138 having a head 139a connected at one of its ends, and a seat member 139b adapted for connection to the other end of shaft 138 within passage 137, as will be explained. A brine check assembly consisting of a ball 139c and a seat 139d are adapted for placement into the brine inlet passage formed in brine inlet nipple 120. Shaft 138 of the brine shuttle assembly extends between the legs of check valve seat 139d, as will later be explained.

A brine valve cap member 139e is adapted for mounting to the end of brine valve body 118 to seal the passage formed therein and to place selected passages in fluid communication with each other, as will be explained. A pair of o-rings 139f and 139g are placed between cap member 139e and brine valve body 118 to ensure a fluid-tight seal.

Figure 3:
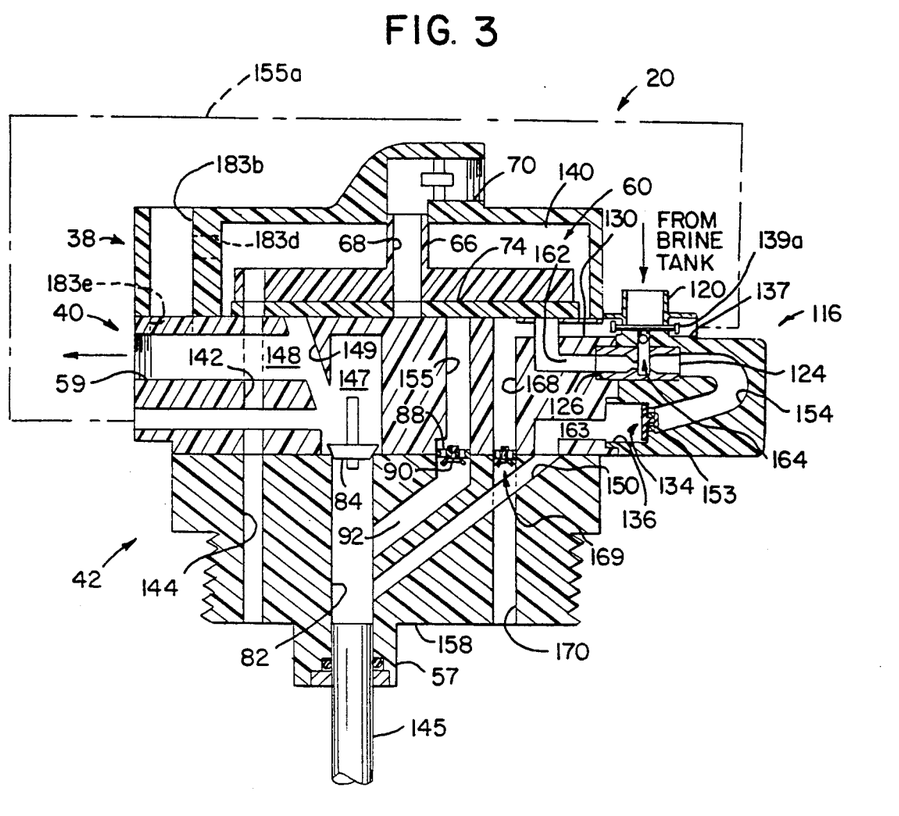
FIG. 3 is a schematic cross-sectional view through the assembled valve of FIG. 1, showing a valve lower section providing upflow brining.

FIG. 3 illustrates in schematic form a section through valve assembly 20. It is understood that the section view represented in FIG. 3 is for the purpose of schematically illustrating the flow path of water through valve 20, and does not represent an accurate cross-section through valve 20.

Referring to FIG. 3, when valve upper section 38 is assembled to valve middle section 40, hard water introduced into valve 20 through inlet 58 (FIG. 2, not shown in FIG. 3) first flows into inlet cavity 140 formed in valve upper section 38, and in which rotor member 60 is located. Rotor member 60 and valve seat member 74 act to control the flow path of water from inlet cavity 140 into valve middle section 40.

FIG. 3 illustrates a normal service position in which inlet hard water is routed through passages in rotor member 60 and valve seat member 74 from inlet cavity 140 to a passage 142 formed in valve middle section 40 and a passage 144 formed in valve lower section 42 and downwardly into the mineral tank. Treated water flows upwardly from the mineral tank through the stand pipe, shown at 145, and into passage 82 formed in valve lower section 42. This upward flow of water through passage 82 unseats float valve 84, allowing flow of water into a passage 147 in valve middle section 40 and to an outlet passage 148 through a passage 149, and to the outlet 59 of valve 20. Water flowing through passage 92 in valve lower section 42 is prevented from entering valve middle section 40 by a diaphragm-type check valve assembly consisting of valve seat 88 and diaphragm 90. Similarly, water flowing through a brine refill passage 150 in valve lower section 42 is prevented from entering brine valve 116 by diaphragm 134 seating against a valve seat member 153 located at the entrance into a passage 154 associated with brine valve 116.

A passage 155a is formed in valve middle section 40 and communicates between treated water passage 147 and passage 132 (FIG. 2). Passage 155a is physically an internal passage in valve middle section 40, but for clarity is shown in FIG. 3 as a phantom line. Passage 132 communicates treated water pressure to passage 137 through a passage 155b (FIG. 2) formed in brine valve body 118, and a space 155c which is sealed by brine valve cap member 139e when brine valve 116 is assembled. The treated water pressure in passage 137 (FIG. 3) acts on brine shuttle assembly head 139a to move the brine shuttle assembly to a closed position, as will later be explained.

To backwash the mineral bed, rotor member 60 is moved to a position in which communication is established between inlet cavity 140 and a passage 155 in valve middle section 40, and communication is also established between passage 149 and inlet cavity 140. When this occurs, float valve 84 is moved to its closed position, and intake hard water from inlet cavity 140 is routed directly from passage 149 to outlet passage 148, thereby bypassing tank 22. Water pressure in passage 155 forces diaphragm 90 away from seat 88 to provide water flow through passage 92 and downwardly through passage 82. This intake water is then routed downwardly through stand pipe 145 and into the mineral bed, and water from the mineral bed flows upwardly through tank 22 to passage 144 in valve lower section 42 and to passage 142 in valve middle section 40. In the backwash position, rotor member 60 and seal plate 74 establish communication between the upper end of passage 142 and drain passage 68 formed in rotor member stem 66, allowing discharge of the backwash water from valve 20 through drain outlet 70.

In a brine/slow rinse position, rotor member 60 is moved to a position in which communication is established between inlet cavity 140 and the upper end of passage 162 in valve middle section 40, as well as maintaining communication between cavity 140 and passage 149. Drain passage 68 is placed into communication with passages 142 and 155. Intake water again flows in from inlet cavity 140 through passages 149 and 148 to outlet 59, bypassing tank 22. Pressure in passage 147 maintains float valve 84 in its closed position. In this position, water pressure is provided to injector member 124, which creates a vacuum at area 164 to draw brine in through brine inlet 120 from the brine tank. This provides flow of mixed intake water and brine through passage 154 past diaphragm 134, and through a passage 163 to passage 150 in valve lower section 42 and to passage 82 and downwardly through stand pipe 145. This regenerates the mineral bed in tank 22. Excess water from the mineral bed is flushed upwardly through the tank 22 to passage 144 through passage 142 in valve middle section 40 and through valve seat member 74 and rotor member 60 to drain passage 68 to drain outlet 70.

In a fast rinse/refill position, rotor member 60 is moved to a position in which communication is established between inlet cavity 140 and the upper end of a passage 168 formed in valve middle section 40. Communication is also established between drain passage 68 and the upper end of passages 149 and 155. In this position, intake water passes downwardly through passage 168 past a diaphragm check valve 169 to a passage 170 formed in valve lower section 42, and downwardly into the mineral bed. The water is thus treated, and the treated water then flows upwardly through standpipe 145 into passage 82 in valve lower section 42. The treated water then flows from passage 82 to unseat float valve 84, and flows into passage 147. It then is discharged through passage 149 to discharge passage 68 and to drain outlet 70. The treated water is also available for service through outlet passage 148 and outlet 59.

Also in the fast rinse/refill position, intake water pressure is supplied to passage 130, which is in communication with the upper end of passage 168 in valve middle section 40. Water pressure in passage 130 acts on the seat of the brine shuttle assembly, as will be explained, to move the brine shuttle assembly to its open position. In its open position, the brine shuttle assembly allows treated water to flow from passages 155a and 137 past the brine shuttle head and into the passage in brine inlet nipple 120, to refill the brine tank with treated water. After the fast rinse/refill mode is completed, communication between inlet cavity and passage 130 is cut off and fluid pressure in passage 137 forces the brine shuttle assembly to its closed position, thus cutting off flow of treated water into the brine tank.

Figure 4:
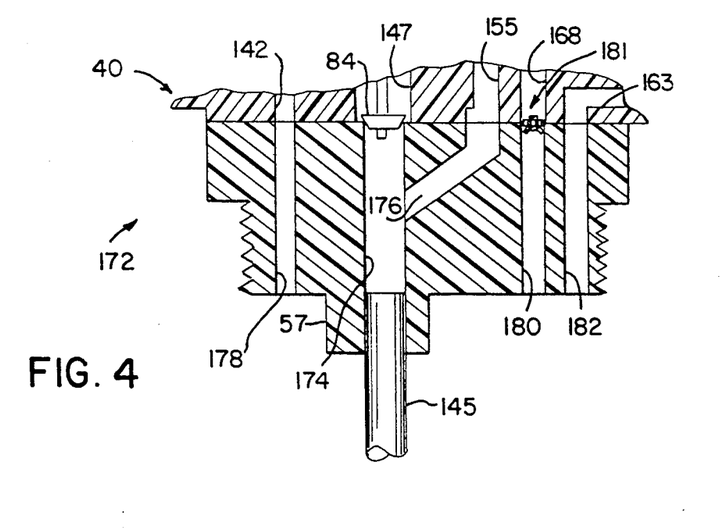
FIG. 4 is a schematic partial sectional view showing an alternate construction for the lower section of the valve of FIG. 3, providing downflow brining.

In the positions described above and with the valve structure as illustrated in FIG. 3, the brining operation occurs with brine solution passing downwardly through standpipe 145, forcing water from the mineral bed to flow upwardly through the tank. This mode of operation is known as "upflow" brining. In some use environments, it is desirable to provide "downflow" brining, in which the brine solution flows downwardly through the mineral bed to force water from the mineral bed upwardly through the standpipe. In the past, it has been necessary to provide a completely different valve structure in a downflow brining environment than in an upflow brining environment. With the present invention, however, it is only necessary to modify valve lower section 42 and replace rotor member 60, to achieve downflow brining. As illustrated in FIG. 4, a lower valve section 172 is installed in valve assembly 20 in place of the lower valve section 42 illustrated in FIG. 3. Like valve lower section 42, lower section 172 includes a riser insert 57 adapted to receive the upper end of standpipe 145. The upper end of standpipe 145 is in communication with a passage 174, which communicates with passage 147 in middle valve section 40. A passage 176 extends between passage 174 and passage 155 formed in valve middle section 40. A passage 178 extends between passage 142 in valve middle section 40 and the upper end of the tank. A passage 180 extends between passage 168 in valve middle section 40 and the upper end of the tank, and a diaphragm type check valve assembly 181 is disposed between the upper end of passage 180 and the lower end of passage 168. A passage 182 extends between passage 163 in valve middle section 40 and the upper end of the tank.

With valve lower section 172 installed in valve assembly 20 in place of lower valve section 142, the service, backwash modes are substantially identical in flow as described previously. However, in the brine/slow rinse mode brine introduced through the brine valve 116 passes downwardly through passage 182 into the tank and through the mineral bed. Excess water then flows upwardly through standpipe 145 and into passage 174, through passage 176 and upwardly through passage 155 to drain passage 68. In the fast rinse/refill position, the same flow takes place without drawing brine, and additional intake water is introduced through passage 168 and past check valve assembly 181 at the upper end of passage 180, and downwardly through passage 180 into the tank.

As will later be explained, rotor member 60 has a slightly different parting arrangement for downflow brining than for upflow brining.

Referring to FIGS. 2 and 3, an optional hardwater blending system can be incorporated into valve assembly 20 by use of a bonnet valve 183a. Bonnet valve 183a is adapted to be mounted in a passage 183b extending through a lug 183c formed integrally with valve upper section 38, which extends completely through valve upper section 38. To provide hardwater blending, a horizontal passage 183d is formed in valve upper section 38 along the dashed lines shown in FIG. 3, to establish communication between intake cavity 140 and vertical passage 183b in valve upper section 38. Additionally, a passage 183e is formed in the upper portion of valve middle section 40, extending between the lower end of vertical passage 183b and outlet passage 148 in valve middle section 40. When bonnet valve 183a is installed into vertical passage 183b, bonnet valve 183a is manually adjustable to control the amount of hard water which passes directly from intake cavity 140 through vertical passage 183b and into outlet passage 148 in valve middle section 40. This feature is advantageous in some European markets, where it is desirable to provide service water which is not completely soft by blending hard water with the treated soft water.

Figure 5:
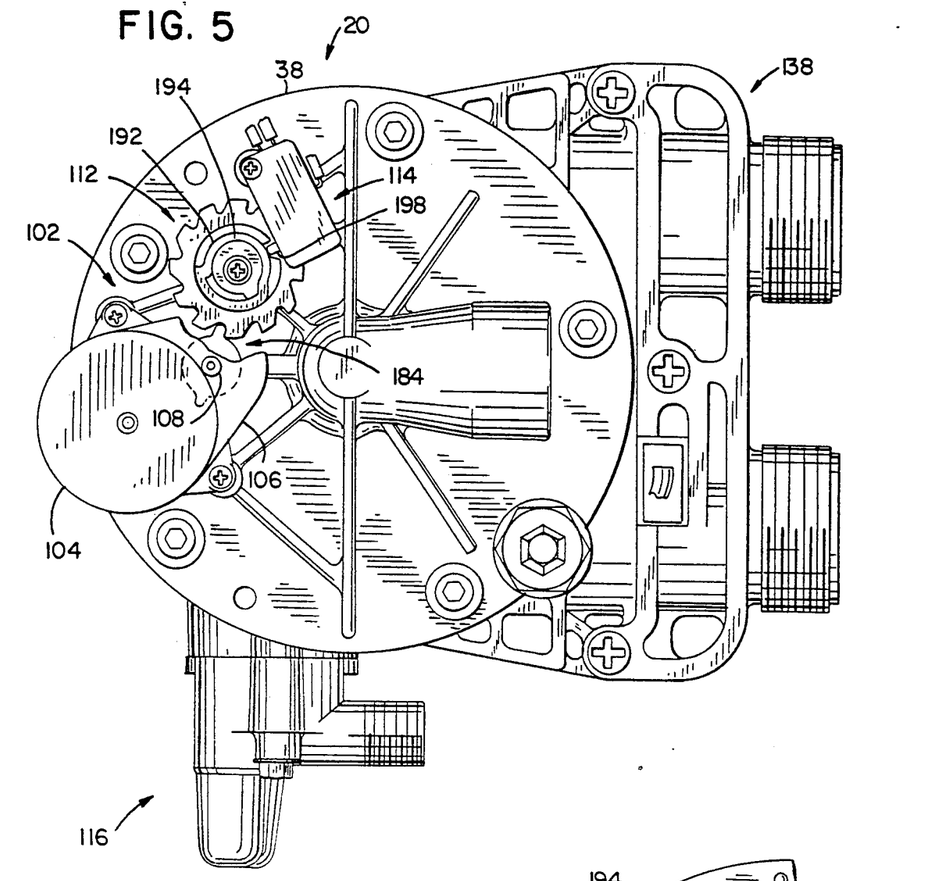
FIG. 5 is a top plan view of the valve of FIG. 1.
Figure 6:
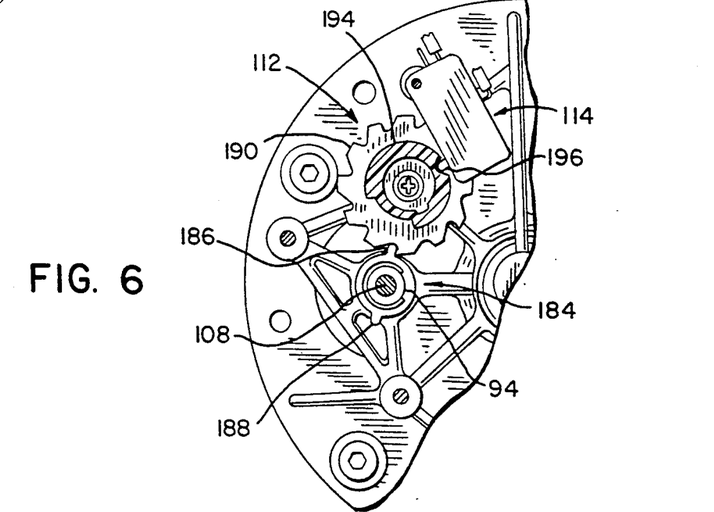
FIG. 6 is an enlarged partial top plan view of a portion of the valve shown in FIG. 5, with portions removed.

Referring to FIG. 5, the mounting of drive assembly 102 to the upper surface of valve upper section 38 is illustrated. As noted previously, drive assembly 102 comprises a motor 104 and a gear box 106, with a drive shaft 108 extending downwardly from gear box 106. A timing gear 184 (FIGS. 5, 6) is keyed to Geneva drive shaft 94, and includes a pair of diametrically opposed drive tabs 186, 188 (FIG. 6). Drive tabs 186, 188 are fixed in position relative to Geneva drive shaft 94 such that drive tabs 186, 188 are in vertical alignment with drive lugs 98, 100, respectively.

As noted previously, drive lugs 98, 100 of Geneva drive shaft 94 act to engage the Geneva cam surfaces 64 formed on rotor member 60. In this manner, rotor member 60 is incrementally advanced about its axis of rotation through a series of positions for selectively placing valve assembly 20 into a selected mode of operation. The movement of drive lugs 98, 100 is mirrored by drive tabs 186, 188 on timing gear 184, which engage a gear 190 which forms a part of actuator member 112. Referring to FIG. 5, actuator member 112 further comprises lower and upper cam actuator surfaces 192, 194, respectively, which are formed integrally with gear 190. Lower actuator surface 194 is engagable with a lower switch member 196 associated with switch assembly 114 (FIG. 6), and upper cam actuator surface 194 (FIG. 5) is engagable with an upper switch member 198 associated with switch assembly 114. Switch assembly 114 is wired into control board 30. The position of rotor member 60 is thus monitored by actuator member 112 in combination with switch assembly 114.

Figure 7:
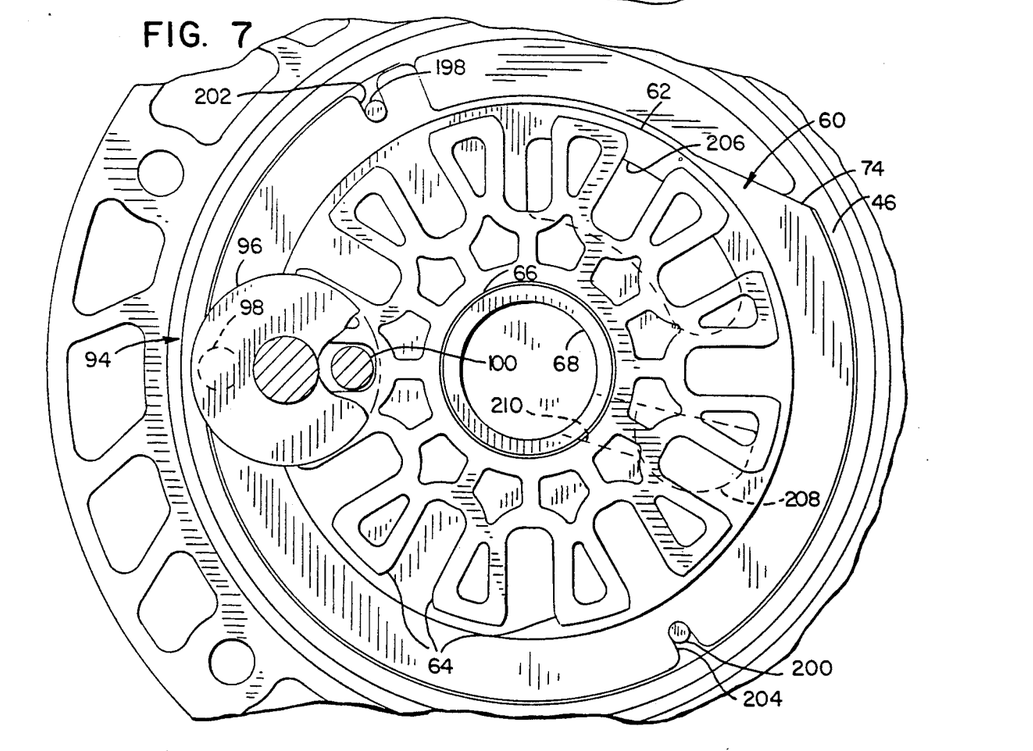
FIG. 7 is a top plan view of the valve of FIG. 5 with its top section removed, showing the rotor member in plan and the Geneva drive shaft engagable therewith.

FIG. 7 illustrates in greater detail the driving engagement of Geneva drive shaft 94 with cam surfaces 64 provided on rotor member 60. With Geneva drive shaft 94 in its position shown in FIG. 7, drive lug 100, which depends from lower plate 96 of Geneva drive shaft 94, is shown in a space defined by facing walls of adjacent cam surfaces 64. When Geneva drive shaft 94 is rotated in response to operation of motor 104 and rotation of drive shaft 108, drive lug 100 rotates into contact with a wall of one of the cam surfaces 64, for imparting rotary movement to rotor member 60 and to cause rotor 60 to incrementally advance. Continued rotation of Geneva drive shaft 94 brings drive lug 98 into a space between adjacent cam surfaces 64, for advancing rotor member 60 another increment until the desired position of rotor member 60 is attained.

Referring still to FIG. 7, valve seat member 74 is illustrated as positioned on top of flat upper surface 46 of valve middle section 40. A pair of diametrically opposed studs 198, 200 extend upwardly from upper surface 46 of valve middle section 40. Studs 198, 200 are received within slots 202, 204, respectively formed in the outer edge of valve seat member 74 for maintaining valve seat member 74 in position relative to valve middle section 40. Referring briefly to FIG. 2, it is seen that valve seat member 74 is provided with openings therethrough in locations which correspond to the locations of openings formed in the upper surface of valve middle section 40, for providing fluid communication into and out of valve middle section 40.

Still referring to FIG. 7, plate-like lower portion 62 of rotor member 60 is provided with an elongated opening 206. Referring momentarily to FIG. 3, opening 206 is employed to establish fluid communication between inlet cavity 140 in valve upper section 38 and one of the passages formed in valve middle section 40 through valve seat member 74. In addition, an opening 208, shown in phantom at 208 in FIG. 7, is formed in the underside of plate-like lower portion 62 of rotor member 60. A passage 210 extends between opening 208 and drain passage 68 formed in stem 66 of rotor member 60. Referring again briefly to FIG. 3, passage 68 in stem 66, in combination with passage 210 and opening 208, cooperate to define a flow path through rotor member 60 to provide communication between drain opening 70 in valve upper section 48 and one of the passages formed in valve middle section 40.

Figures 8, 9, 10:
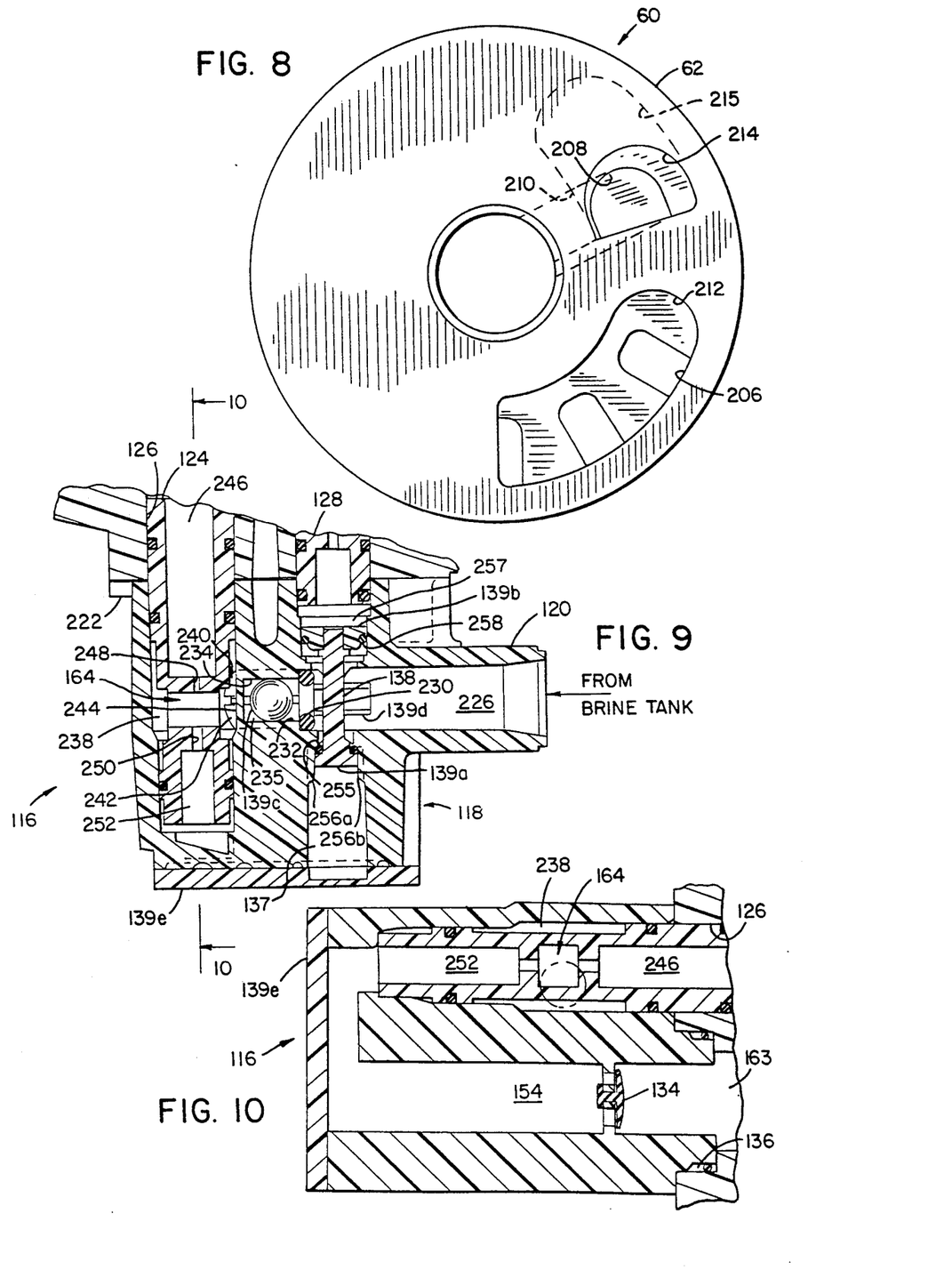
FIG. 8 is a bottom plan view of the valve rotor member.
FIG. 9 is a partial top sectional view showing the brine valve injector system for routing brine from the brine tank to the mineral bed.
FIG. 10 is a sectional view of the brine valve system of FIG. 9 taken generally along line 10—10 of FIG. 9.

FIG. 8 illustrates the underside of valve rotor member 60 as constructed for a downflow brining application. As shown, opening 206 opens into a recess 212 which faces toward the lower surface of lower portion 62. Similarly, opening 208 opens into a downwardly facing recess 214 formed in the lower surface of lower portion 62. Recesses 212, 214 act to establish communication between passages in valve middle section 40 and passages 206, 208, respectively, when rotor member 60 is in a position in which openings 206, 208 are not directly aligned with the passages in valve middle section 40 with which they communicate.

For an upflow brining application, rotor member 60 is modified by extending recess 214 to encompass the area represented by phantom line 215. This modification provides discharge of waste water from passage 142 (FIG. 3) through valve seat member 74 in an upflow brining situation.

FIGS. 9 and 10 illustrate brine valve assembly 116 in detail. Referring to FIG. 9, brine valve assembly 116 generally includes a one-piece brine valve body 118, including a mounting flange 222 adapted for placement against a mounting surface formed on valve middle section 40. Brine valve body 118 is mountable to valve middle section 40 by means of a series of threaded fasteners extending through brine valve body 118 and cap member 139e into openings formed in the mounting surface of valve middle section 40.

As noted previously, brine valve body 118 includes a brine inlet nipple 120 which is adapted for connection to the end of a line connected at its other end to the brine tank (not shown). A passage 226 is formed in the interior of nipple 120 and check ring valve seat 139d which includes an opening 230 is placed against a shoulder at the inner end of brine passage 226. A series of ribs, two of which are shown at 232, 234 extend longitudinally within a check passage 235 to the left of the shoulder at the inner end of passage 226, and check ball 139c is located in check passage 235. Check passage 235 communicates with an annular space 238 located around the medial portion of injector member 124, through openings representatively illustrated at 240, 242. A rib, such as shown at 244, maintains check ball 139c in position within check passage 235.

As noted previously, a passage 126 is formed in the mounting surface of valve middle section 40, and the inner portion of injector member 124 is located in passage 126. Referring briefly to FIG. 3, passage 126 communicates with passage 162 formed in valve middle section 40, which is selectively exposed to fluid pressure through rotation of rotor member 60. An inlet water passage 246 (FIG. 9) is formed in injector member 124, leading to a restriction 248 which communicates between passage 246 and brine inlet area 164. In a manner as is known, when fluid pressure is supplied to inlet passage 246, restriction 248 creates a vacuum in brine inlet area 164 to unseat check ball 139c from opening 230, and to allow flow of brine from brine passage 226 through check passage 235 and the openings in the end thereof, such as shown at 240, 242, into brine inlet area 164. The mixed brine and intake water then flows from brine inlet area 164 through a passage 250 having a diameter larger than that of restriction 248, and from passage 250 to a passage 252 formed in the end of injector member 124 opposite passage 246. From passage 252, the mixed brine and intake water flows to passage 154 (FIG. 10), which unseats diaphragm check valve 134 and allows flow of mixed brine and intake water into brine passage 163 in valve middle section 40 (FIG. 3), and downwardly through the valve structure to the mineral bed to recharge the bed.

As also shown in FIG. 9, shaft 138 of the brine shuttle assembly is located in brine inlet passage 226 between the legs of check valve seat 139d. Shuttle assembly head 139a is located in passage 137, which is in communication with treated water passage 132 (FIGS. 2, 3) and is thereby exposed to treated water pressure. An o-ring 255 is located against the inner shoulder formed by head 139a and shaft 138, and is adapted to seat against a shoulder formed at the inner end of passage 137. A series of ribs, such as shown at 256a and 256b, are formed in passage 137 adjacent the shoulder. Shuttle assembly seat 139b is located in a passage 257 formed in brine valve body 220, and an o-ring 258 is retained within a groove formed in seat 139b and is adapted to seat against a shoulder formed on the inner end of passage 257 to form a fluid-tight seal. With the illustrated arrangement, the shuttle assembly is reciprocably movable between a closed position in which head 139a seats against the shoulder at the inner end of passage 137, as shown, and an open position in which head 139a is moved away therefrom. The brine shuttle assembly is caused to move to its open position by pressure in passage 257, which results from movement of rotor member 60 to the fast rinse/refill position whereby water pressure is introduced into passage 130 (FIG. 2). The face of shuttle assembly seat 139b has an area greater than that of shuttle assembly head 139a, and accordingly, the presence of pressure in passage 257 unseats head 139a to establish communication between treated water passage 137 and brine passage 226. Treated water then flows from passage 137 through brine passage 226 and the brine line into the brine tank. When passage 206 in rotor member 60 moves past the fast rinse/refill position to cut off the supply of water pressure in passage 257 and the trailing drain opening passage 208 in rotor member 60 lowers the pressure in passage 257, the pressure in passage 137 acts on the face of head 139a to once again seat head 139a against the shoulder at the inner end of passage 137.

Figures 11, 12, 13, 14:
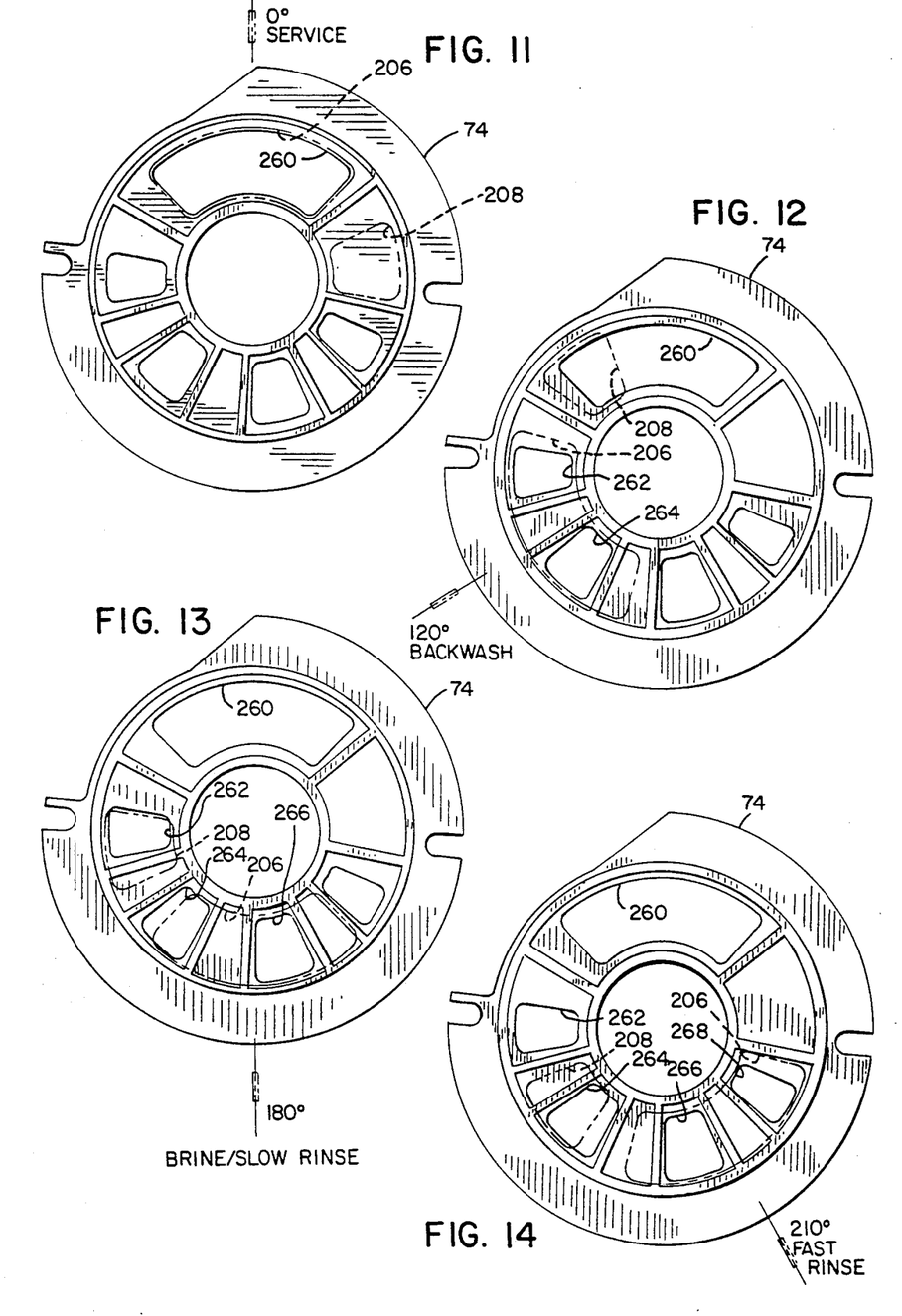
FIGS. 11-14 are top plan views of the valve seat member, showing in phantom the position of the rotor member ports relative to the openings of the valve seat member.

Reference is now made to FIGS. 11-14, which illustrate the various positions of openings 206, 208 in downflow rotor member 60 relative to the top of valve seat member 74. In each figure, the top of seal plate 74 is illustrated in solid lines, and the phantom lines indicate openings 206, 208 in rotor member 60. In the 0° service position shown in FIG. 11, opening 206 in rotor member 60 is shown aligned with a service port 260, which corresponds in location with the upper end of passage 142 (FIG. 3). In the service position, drain opening 208 is blocked. FIG. 12 illustrates rotor member 60 at a 120° position for backwashing the mineral bed. In this position, pressurized fluid is supplied through opening 206 in rotor member 60 to a backwash port 262, which corresponds in location to the upper end of passage 155 (FIG. 3) in valve middle section 40. Intake hard water is also supplied through opening 206 to hardwater bypass port 264, which corresponds in location to the upper end of passage 149 (FIG. 3) in valve middle section 40.

Referring to FIG. 13, the openings in rotor member 60 are shown rotated to the 180° brine/slow rinse position. In this position, drain opening 208 in rotor member 60 is disposed over backwash port 262, which opens passage 155 (FIG. 4) to drain passage 68 in rotor member 60. In this position, inlet port 206 in rotor member 60 is located over hardwater bypass port 264, and also over a brining port 266, which corresponds in location to the upper end of passage 162 (FIG. 3) in valve middle section 40.

In FIG. 14, the openings in rotor member 60 are shown rotated 210°, which is the fast rinse position. In this position, rotor member drain opening 208 is in communication with hardwater bypass port 264. Inlet opening 206 is positioned over brining port 266, and also over a rinse port 268, which corresponds in location to the upper end of passage 168 (FIG. 3) in valve middle section 40.

Figures 15, 16, 17, 18:
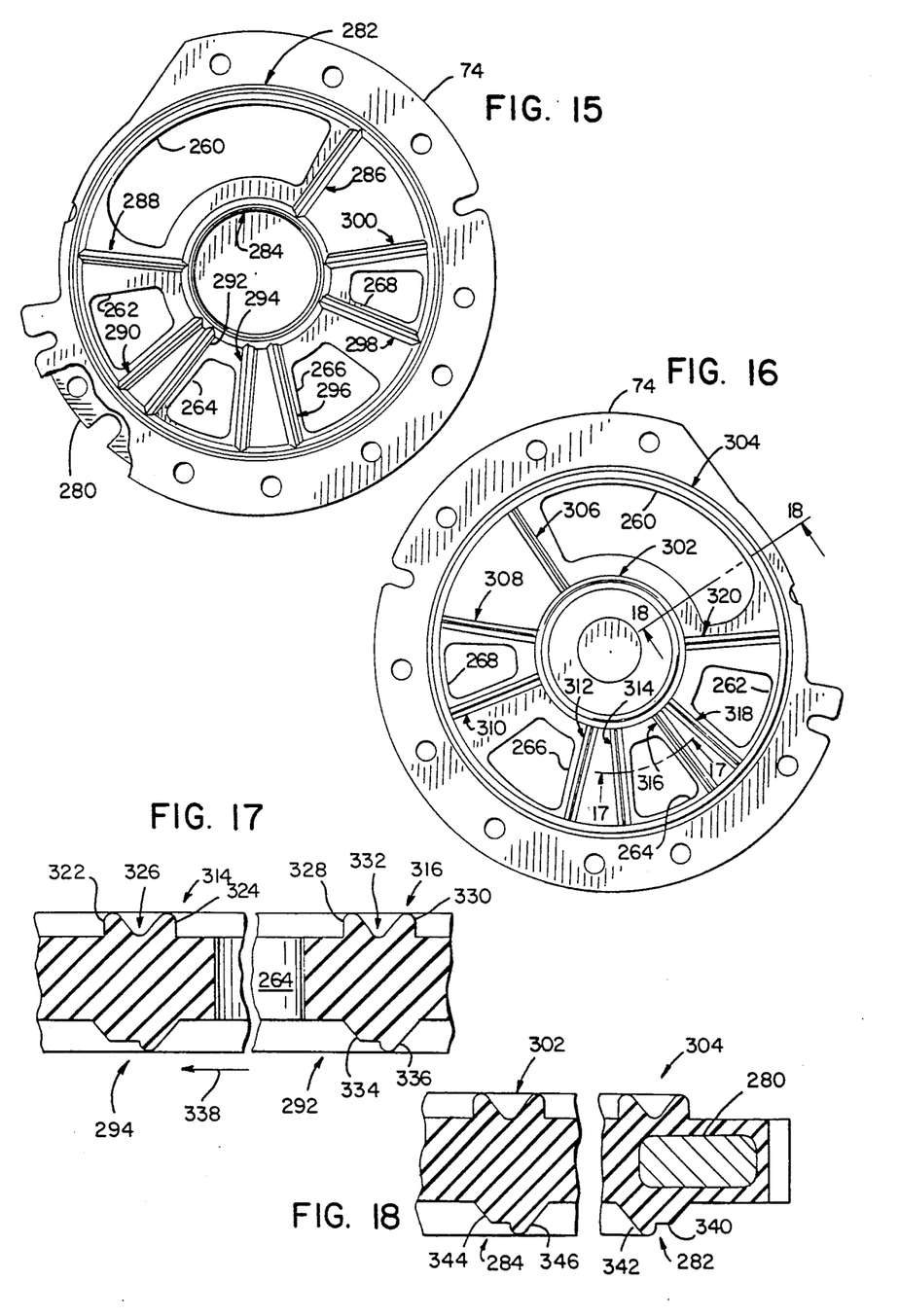
FIG. 15 is a top plan view of the valve seat member of FIGS. 11-14, with a portion broken away.
FIG. 16 is a bottom plan view of the valve seat member of FIG. 15.
FIG. 17 is a partial sectional view taken generally along line 17—17 of FIG. 16.
FIG. 18 is a partial sectional view taken generally along line 18—18 of FIG. 16.

FIGS. 15-18 illustrate in greater detail the construction of valve seat member 74. FIG. 15 illustrates the top plan view of valve seat member 74, while FIG. 16 represents its bottom plan view.

Referring to FIG. 15, valve seat member 74 generally comprises an annular reinforcing or stiffening ring, shown at 280. Ring 280 is preferably formed of metal, and the remainder of valve seat member 74 comprises a thermoplastic elastomeric material encapsulating reinforcing ring 280. This material allows valve seat member 74 to be injection molded. The material of valve seat member 74 may advantageously be formed of a base resin of Monsanto "Santoprene", FDA grade 171-73.

A pair of annular raised ribs are formed on valve seat member 74, the outer of which is shown at 282 and the inner of which is shown at 284. A series of radial raised ribs extend between outer and inner ribs 282, 284, and are shown at 286, 288, 290, 292, 294, 296, 298 and 300. Outer and inner ribs 282, 284, in combination with radial ribs 286-300, act to surround ports 260, 262, 264, 266 and 268, to provide a fluid-tight seal between the upper surface of valve seat member 74 and the underside of rotor member 60.

Referring to FIG. 16, the underside of valve seat member 74 is provided with an inner annular rib 302 and an outer annular rib 304. A series of radial ribs 306, 308, 310, 312, 314, 316, 318 and 320 extend between inner and outer annular ribs 302, 304. Ribs 302 and 304, in combination with radial ribs 306–320, act to surround openings 260–268 in valve seat member 74 to provide a fluid-tight seal between the underside of valve seat member 74 and the upper surface of valve middle section 40.

Referring to FIGS. 17 and 18, the construction of ribs 314 and 316 on the underside of valve seat member 74 is illustrated, as is the construction of ribs 292, 294 in the top side of valve seat member 74. Ribs 292, 294 and 314, 316 act in combination with the inner and outer annular ribs on the top and bottom surfaces of valve seat member 74 to surround port 264. Ports 260, 262, 266 and 268 are enclosed in a similar manner by the rib structures formed on the top and bottom surfaces of valve seat member 74.

As noted, valve seat member 74 is statically mounted to the upper surface of valve middle section 40. Rib 314 comprises a double rib structure including a rib 322 and a rib 324, with a depression 326 located therebetween. Rib 316 on the other side of port 264 is similarly constructed, comprising a rib 328, a rib 330 and a depression 332 located therebetween. When valve seat member 74 is sandwiched between the underside of rotor member 60 and the upper surface of valve middle section 40, ribs 322, 324, 328 and 330 are compressed so as to provide a fluid-tight seal. When rotor member 60 is rotated so as to provide water pressure to port 264, for example, the water pressure exerts a lateral force on ribs 324 and 328. The construction of ribs 326 and 332 is such that the lateral force so exerted only serves to assist in sealing between ribs 324, 328 and the upper surface of valve middle section 40. The presence of the depressions 326, 332 between ribs 322, 324 and 328, 330, respectively, allows lateral movement of the ribs when a lateral force is exerted thereon by water pressure, to assist in sealing.

In some instances, a lateral force due to water pressure will be exerted in opposite directions on a radial rib, e.g. rib 310 (FIG. 16) between ports 266 and 268. Each radial rib being identical in construction to ribs 314, 316 (FIG. 17), the depression between adjacent ribs allows lateral deflection of each rib in opposite directions to assist in sealing.

The construction of inner and outer annular ribs 302, 304 on the underside of valve seat member 74 is similar to that shown and described in FIG. 17 with respect to radial ribs 314 and 316.

Referring again to FIG. 17, ribs 292 and 294 in the top side of valve seat member 74 will be described. As noted previously, rotor member 60 (FIG. 2) is assembled to valve upper section 38, and a downward spring force is exerted on rotor member 60 by the wave spring washer 78 disposed between rotor member 60 and valve upper section 38. In this manner, a downward preloading force of approximately 120 pounds is exerted on rotor member 60, which bears against the ribs formed on the top surface of valve seat member 74. Additionally, water pressure acting on the top surface of rotor member 60 drives it against valve seat member 74, to seat rotor member 60 against valve seat member 74, assisted by the preloading on rotor member 60 by the spring.

Each of the radial ribs in the top side of valve seat member 74 is formed similarly to ribs 292 and 294, illustrated in FIG. 17. Referring to rib 292, each rib comprises a compound rib structure providing a relatively wide base rib 334 and a seal rib 336. Base rib 334 resists the compressive force exerted on valve seat member 74 by rotor member 60, while seal rib 336 is deformed slightly under the compressive load to provide a fluid-tight seal against the underside of rotor member 60.

Rotor member 60 rotates relative to valve seat member 74 in the direction of the arrow 338 in FIG. 17. Each of radial ribs 286, 288, 290, 292, 298 and 300 is constructed similarly to ribs 292 and 294 as illustrated in FIG. 17, in which the leading angled surface of seal rib 338 is oriented toward the direction of rotation of rotor member 60. In this manner, as valve seat member 60 rotates on valve seat member 74, the seal ribs, such as 336, are uniformly compressed downwardly toward base rib 334.

Referring to FIG. 18, outer and inner ribs 282, 284 on the top surface of valve seat member 74 are constructed similarly to ribs 292, 294, shown in FIG. 17 and described above. Outer rib 282 comprises a base rib 340 and a seal rib 342, and inner rib 284 comprises a base rib 344 and a seal rib 346. The leading surfaces of seal ribs 342, 346 are oppositely oriented.

Figure 19:
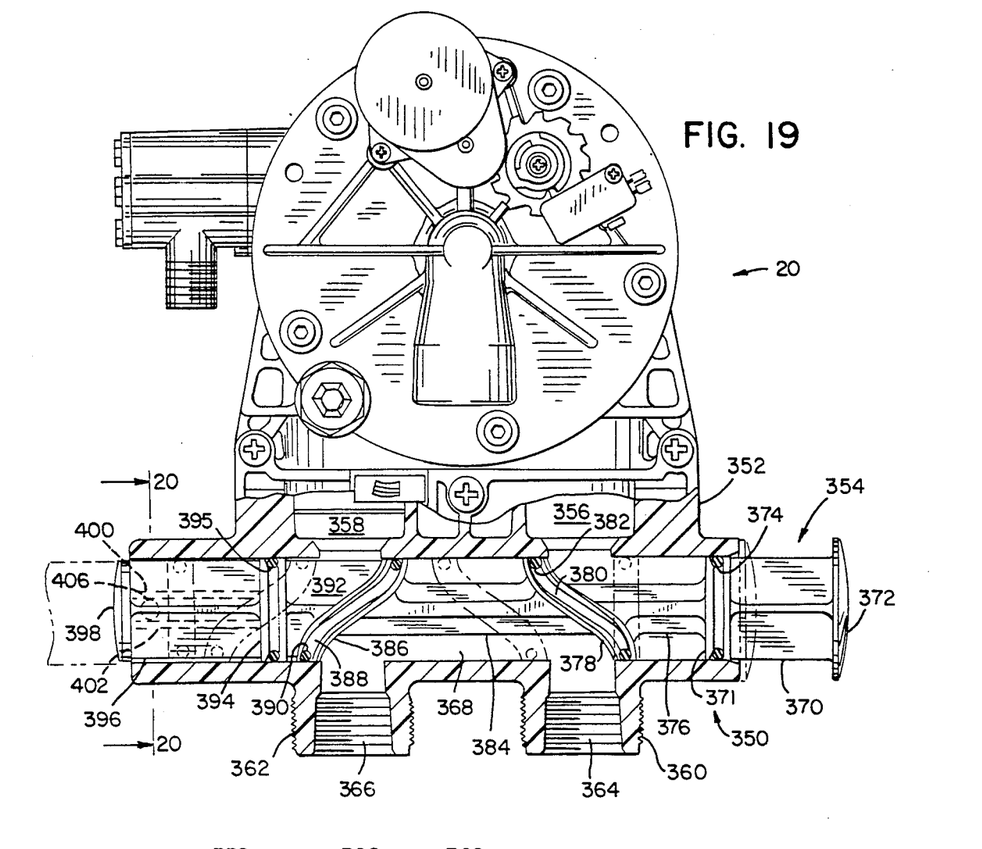
FIG. 19 is a top plan view showing the valve assembly of FIG. 1 with a bypass valve constructed according to the invention connected thereto, with portions of the bypass valve broken away.
Figure 20:
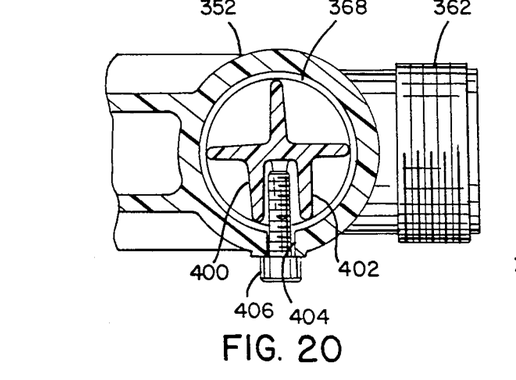
FIG. 20 is a section view taken generally along line 20—20 of FIG. 19.
Figure 21:
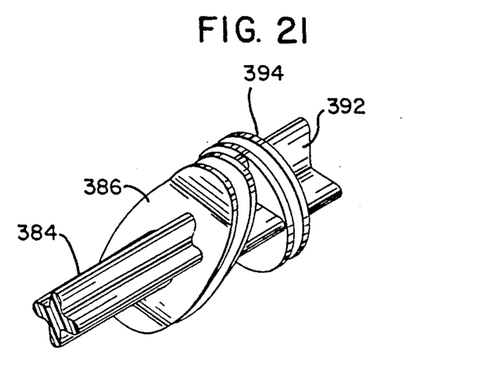
FIG. 21 is a partial isometric view showing a flow diverter member associated with the spool assembly of the bypass valve of FIG. 17.

Reference is now made to FIGS. 19–21, which illustrate an improved bypass valve, shown generally at 350, usable in connection with valve assembly 20. Bypass valve 350 is connected to valve assembly 20 in place of inlet/outlet member 138 (FIGS. 1 and 5). Bypass valve 350 is manually operable for selectively routing water through valve assembly 20 and the water conditioning system, or for bypassing the conditioning system and valve assembly 20.

Bypass valve 350 generally includes a valve body 352 and a spool member 354. Valve body 352 includes an inlet port 356 and an outlet port 358. When valve body 352 is connected to valve middle section 40 in place of inlet/outlet assembly 138, inlet port 356 is in communication with inlet port 58 in valve middle section 40, and outlet port 358 is in communication with outlet port 59 in valve middle section 40.

Valve body 352 further includes an inlet nipple 360 connectable to the water supply to valve assembly 20, and an outlet nipple 362 connectable to the water outlet line. Inlet nipple 360 includes an inlet passage 364, and outlet nipple 362 includes an outlet passage 366. Inlet passage 364 extends along a longitudinal axis which is in line with the longitudinal axis of inlet port 356 and valve middle section inlet 58. Outlet passage 366 extends along a longitudinal axis in line with outlet port 358 and valve middle section outlet 59.

Spool member 354 is mounted for sliding longitudinal movement within a spool passage 368 formed in bypass valve body 352. Spool member 354 is movable between a bypass position shown in solid lines in FIG. 19, and an operating position shown in phantom in FIG. 19. Spool member 54 generally includes a right-hand end portion 370 providing a plate 372 at its right end, and at its left end an o-ring seat 371 in which an o-ring 374 is positioned. A shaft 376 extends from the left-side of o-ring seat 371 and is connected at its left end to a sealing land 378. Land 378 is provided with an o-ring seating area 380, and an o-ring 382 is positioned within seating area 380. A shaft 384 extends leftwardly from land 378, and terminates at its leftward end in a sealing land 386. Land 386 is provided with an o-ring seating area 388, and an o-ring 390 is positioned within seating area 388. A connecting portion 392 extends between the leftward side of land 386 and an o-ring seat 394. An o-ring 395 is positioned within o-ring seat 394. A left end portion 396 extends leftwardly from o-ring seat 394, terminating in a plate 398. Plate 398 has a diameter slightly less than the internal diameter of passage 368, which allows spool member 354 to be inserted in a right-to-left direction into passage 368.

Referring to FIG. 20, left end portion 396 of spool member 354 is provided with a pair of ribs 400, 402. An internally threaded opening 404 is formed in bypass valve body 352 toward the left end of passage 368, and a threaded screw 406 extends through opening 404. Screw 406 engages ribs 400, 402 to maintain proper angular orientation of spool member 354 within passage 368. Ribs 400, 402 extend between the leftward surface of o-ring seat 394 and the inner surface of plate 398, which serve to define the extent of travel of spool member 354 within passage 368 due to engagement of screw 406 therewith during leftward and rightward movement of spool member 354.

Spool member 354 can be removed from 368 by removing screw 406 from opening 404 in valve body 352.

In operation, bypass valve 350 functions as follows. When spool member 352 is in its bypass position shown in solid lines, intake water entering valve body 352 through inlet passage 364 is prevented from passing through passage 368 to inlet port 356, and is deflected leftwardly, within passage 368 by land 378. The intake water is then directed to outlet passage 366 by land 386. When spool member 354 is moved leftwardly to its operative position, intake water entering through inlet passage 364 passes over shaft 376 and enters inlet port 356, for entry into valve assembly 20. Water output from valve assembly 20 is supplied to outlet port 358, and is directed over shaft 384 to outlet passage 366. When spool member 354 is in the operative position, a fluid-tight seal is provided for passage of intake water through passage 368 by o-rings 374 and 382. Fluid-tight passage of water from outlet port 358 to outlet passage 366 is provided by o-rings 382 and 390. In the bypass position, o-rings 382 and 390 provide fluid-tight passage of water directly from inlet passage 364 to outlet passage 366, and o-rings 374 and 395 seal inlet and outlet ports 356, 358, respectively, of valve assembly 20.

FIG. 21 illustrates land 386 and o-ring seat 394 in detail. As shown in FIG. 21, land 386 is provided with a curved convex-to-concave shape. When spool member 354 is in its bypass position in passage 368, land 386 spans between the wall of passage 368 to the left of outlet passage 366 and the wall of passage 368 to the right of the opening of outlet port 358 into passage 368, to seal off any communication between outlet port 358 and outlet passage 366. Land 378 is similarly constructed, so that when spool member 354 is in its bypass position, communication between inlet passage 364 and inlet port 356 is cut off.

In the past, bypass valves have been constructed with inlet and outlet passages having a greater center-to-center spacing than the inlet and outlet ports of the conditioner valve, requiring extensive modification in the plumbing system to accommodate the increased center-to-center spacing.

With the construction of bypass valve 350 as shown and described, bypass valve 350 can be installed without extensive modifications to the plumbing which connects the water system to valve 20. This is provided by the center-to-center spacing between inlet passage 364 and outlet passage 366 being identical to the center-to-center spacing of the inlet and outlet ports 356, 358, which is the same as the spacing of the inlet and outlet passages in inlet/outlet member 138. In addition, bypass valve 350 is capable of handling high rates of flow, due to the design of sealing lands 378, 386.

Various alternatives and embodiments are contemplated as being within the scope of the following claims particularly pointing out and distinctly claiming the subject matter regarded as the invention.

I claim:

1. A water conditioning system, comprising:
    a mineral tank for conditioning water; a brine tank for supplying brine to recharge the mineral tank;
    a conditioner valve mounted to the mineral tank and interconnected with an untreated water supply system and a treated water discharge system, the conditioner valve including a movable flow control member for controlling flow of water through the conditioner valve; and
    an injector valve mounted to the conditioner valve and interposed between the conditioner valve and the brine tank for selectively drawing brine from the brine tank and for selectively supplying treated water from the conditioner valve through the injector valve and to the brine tank, the injector valve being responsive to water pressure within the conditioner valve controlled by the movable flow control member.

2. The water conditioning system of claim 1, wherein the injector valve includes a reciprocable shuttle assembly for selective movement between an open position and a closed position responsive to water pressure within the conditioner valve, wherein the shuttle assembly in its open position provides flow of treated water from the conditioner valve through the injector valve and to the brine tank.

* * * * *